Patented July 21, 1931

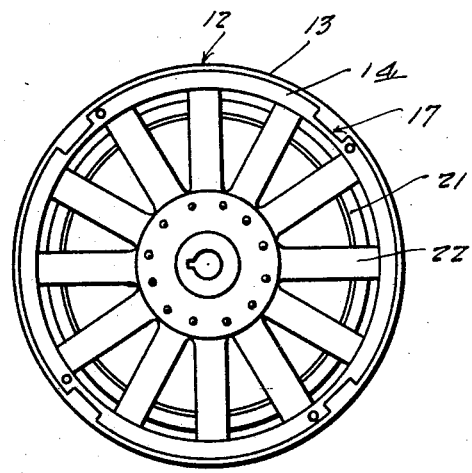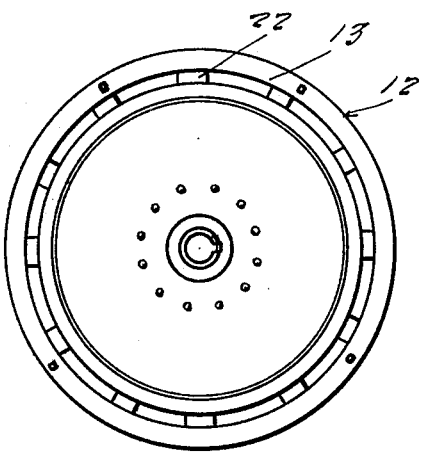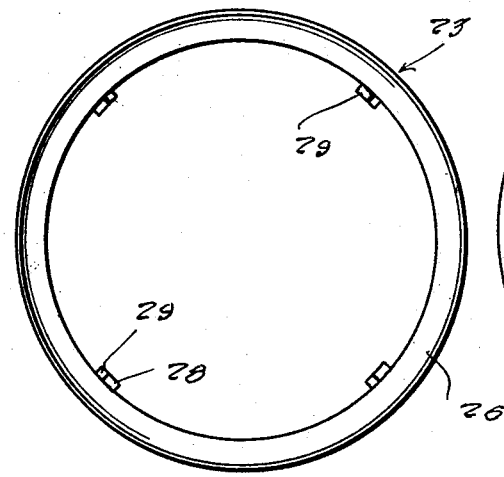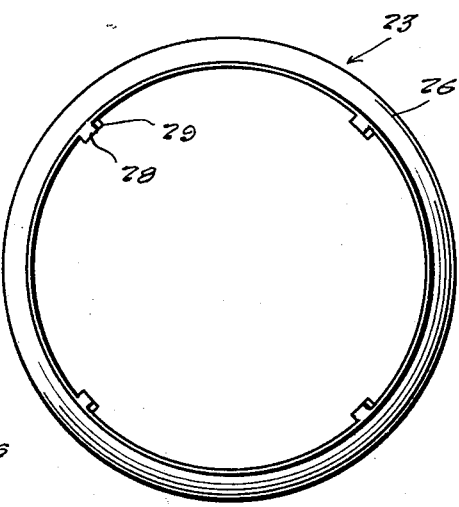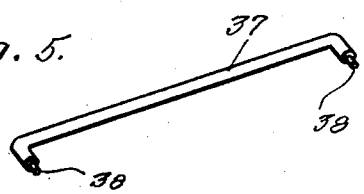

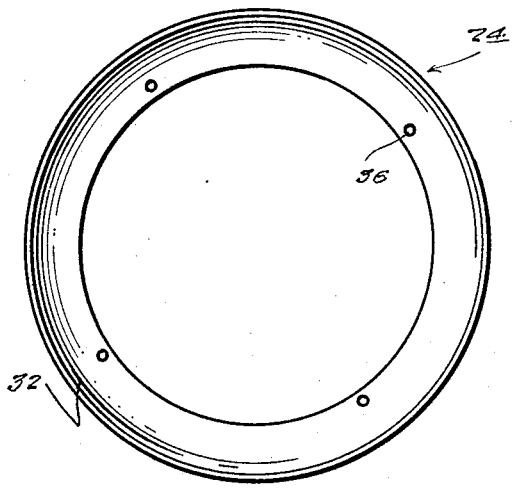
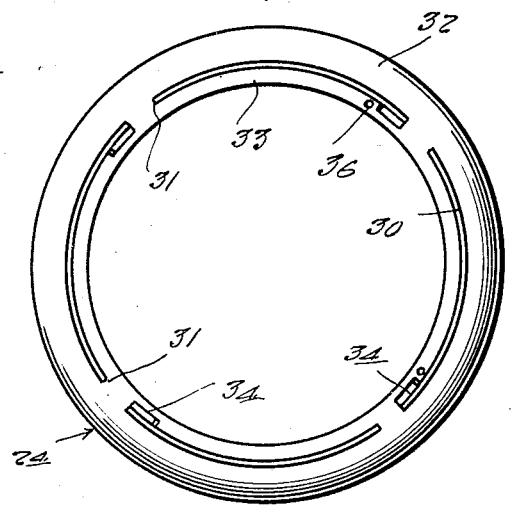
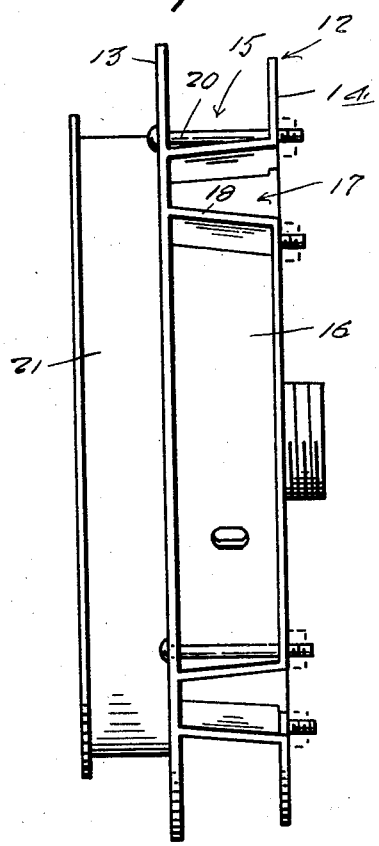

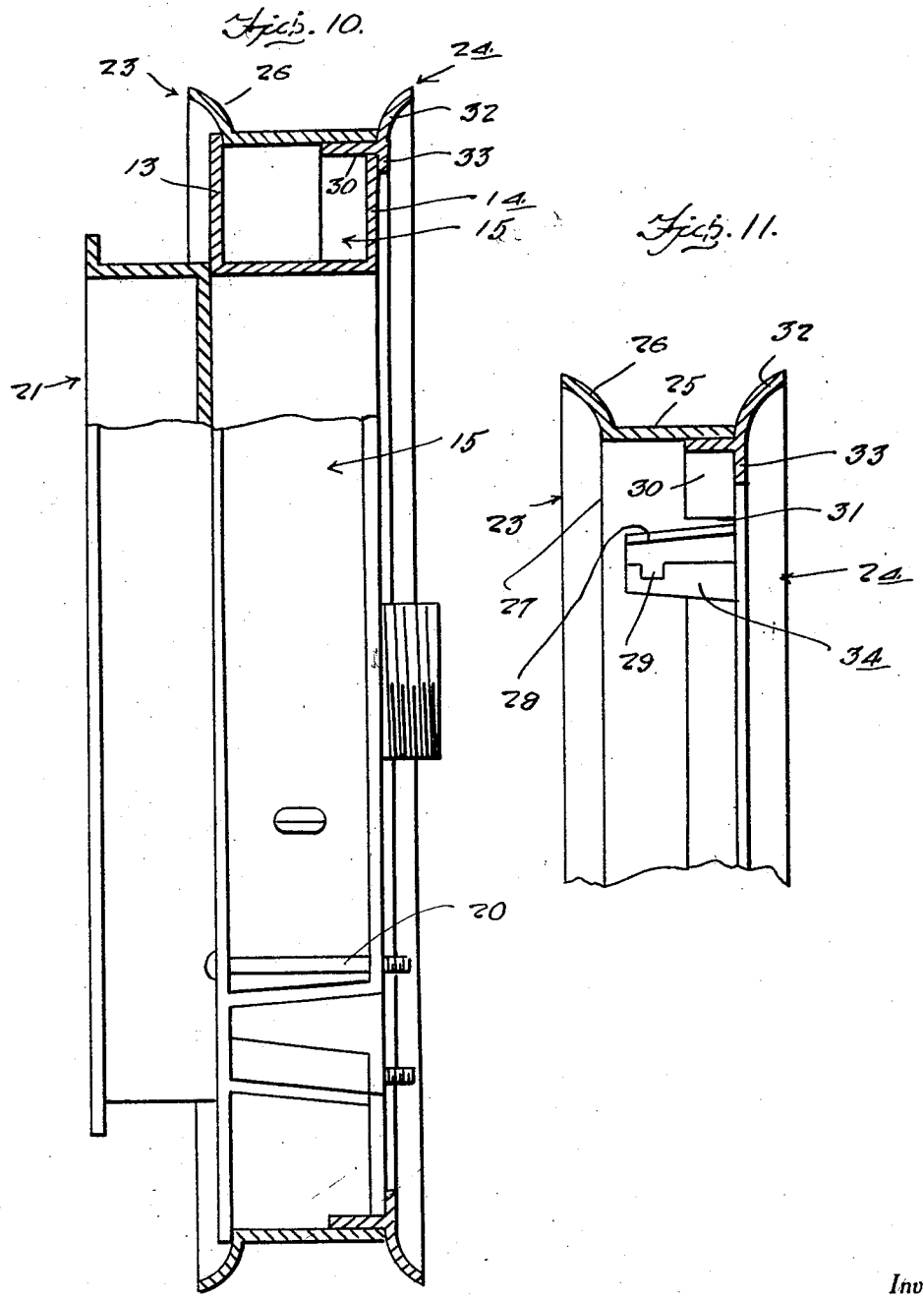

1,815,818

UNITED STATES PATENT OFFICE

WILLIAM O. ALEXANDER, OF PAWHUSKA, OKLAHOMA

DEMOUNTABLE TIRE RIM

Application filed May 10, 1930. Serial No. 451,384.

This invention relates to an improved demountable tire rim for use in association with the motor vehicle wheels.

More specifically stated, the invention comprehends certain structural improvements and refinements in the construction of the wheel felly which is especially designed to accommodate and to structurally co-operate with the sectional demountable tire rim.

In carrying the invention into practice I have evolved and produced a novel wheel rim and a separate unitary tire rim wherein the features of the rims are closely allied in such a manner as to fulfill the requirements of a composite structure of this class in a practical and highly satisfactory manner.

In the drawings:

Figure 1 is an outside elevational view of a vehicle wheel constructed in accordance with the present invention.

Figure 2 is an inside or reverse elevational view of said vehicle wheel.

Figure 3 is an elevational view of the inner section of the demountable tire rim (section shown at the left in Figure 9) observing the same in a direction from right to left.

Figure 4 is an elevational view of the same section looking at the opposite side thereof (in a direction from right to left in Figure 9).

Figure 5 is a perspective view of a tool used for placing the tire rim sections one upon the other in assembly.

Figure 6 is an elevational view of the outer section of the tire rim (see Figure 9) observing the same in a direction from right to left.

Figure 7 is an elevational view of the same section looking at the opposite face or side thereof (left to right in Figure 9).

Figure 8 is an elevational view of the especially constructed wheel felly.

Figure 9 is a fragmentary sectional view showing the major portion of the inner and outer sections of the improved demountable tire rim.

Figure 10 is a view similar to Figure 8 showing the two sections of the tire rim assembled and mounted on the wheel felly.

Figure 11 is a view similar to Figure 9 showing the two sections of the tire rim interconnected.

Attention is first invited to Figure 8, wherein the numeral 12 designates generally the wheel felly. This includes the inboard and outboard circumferential flanges 13 and 14 spaced apart to provide an intervening channel 15. It is observed that the inboard flange 13 is of a diameter greater than the flange 14, whereby to make the flanges of stepped form as seen in Figure 10.

The numeral 16 designates the main felly or web portion between the flanges. The numeral 17 designates circumferentially spaced receptacles defined by the upstanding outwardly diverging transverse ribs 18. These receptacles are open on the outboard side of the wheel as is obvious to serve a purpose to be hereinafter described. The numeral 20 designates the tire rim retaining bolts.

The brake drum is designated generally by the numeral 21. The spokes of the wheel are indicated by numerals 22. The tire rim which fits removably on the wheel felly is composed of a pair of companion sections. The inboard or female section is distinguished by the numeral 23, whereas the outboard or male section is designated by the numeral 24. The configuration of these sections may be readily determined by examining Figures 3, 4, 6, 7 in conjunction with Figure 9.

Referring now to Figure 9 it will be seen that the section 23 embodies an endless annulus 25 having a tire confining flange 26 around one edge. The portion 27 forming the juncture between the annulus and flange constitutes a continuous stop to abut the peripheral edge of the inboard flange 13, as seen in Figure 10.

On the inner periphery of this annulus at circumferentially spaced points, I provide integral transverse keys 28 each of which is provided with a retaining detent 29. The key extends from the outer edge of the annulus and terminates in spaced relation from the annulus shoulder 27.

The outer section comprises a plurality of arcuate segments 30 defining circumferentially spaced notches 31 for reception of the adjacent end portions of the keys 28. These segments 30 are adapted to fit within the area of annulus 25 as seen in Figure 11.

The numerals 32 designates the complemental tire flange. The flanges 26 and 32 are of appropriate curvature to accommodate the beads (not shown) of the tire. The numeral 33 designates an endless lip which constitutes a stop for engaging the short wheel flange 14. For sake of convenience, the aforesaid keys 28 may be designated as a primary key and this co-operates with the companion key or secondary key 34 and the keys 34 are provided with keeper notches 35 to accommodate the detents or tongues 29.

Thus the two keys are disposed in interfitting matched relationship so as to permit them to be swung into the interlocking connected position seen in Figure 11.

Incidentally, the lip 33 is formed with boltholes 36 to accommodate the screw-threaded ends of the aforesaid bolts 20. In this connection I call attention to Figure 5, wherein the numeral 37 designates a suitably designed tool having laterally bent ends formed with journals 38 which are adapted for reception in diametrically opposite pairs of the bolt holes 36 at the time of assembling the sections of the tire rim, permitting the outer section 24 to be turned circumferentially with respect to the section 23 to permit both sections to be disposed in telescoping and interlocking relationship as seen in Figure 11.

This tool is somewhat in the nature of a spanner wrench. In operation, the tire (not shown) is assembled on the tire rim by first placing the tire over the annulus 25 of the rim section 23. Then, the remaining section 24 is brought into place and the segments 30 are slipped into the annulus 25. By using the spanner wrench or tool 37, the section 24 may be turned to engage the detent 29 in the keeper notches so as to interlock the main and secondary keys 28 and 34 respectively.

Thus, the tire rim then assumes the interconnected relationship shown in Figure 11. The tire and rim are then ready to be slipped onto the wheel felly. The aforesaid open-ended transverse pocket 17 serves to accommodate the internal wedge-shaped projection formed by the interconnected keys. In other words, the keys are slipped in between the ribs 18, the endless shoulder coming into abutting relationship with the peripheral edge of the large flange 13 whereas the overlapping end portion of the annulus and segments cooperate with the smaller flange 14.

This brings the two rims into the relative positions shown in Figure 10. The threaded ends of the bolts 20 of course project through the bolt holes 36, whereupon the retaining nuts are put in position.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice if desired.

I claim:

1. In a structure of the class described, a wheel felly of general channel-shaped cross sectional configuration including an endless web portion and inboard and outboard flanges, the inboard flange being of a diameter greater than the outboard flange, pairs of circumferentially spaced transversely extending ribs between the flanges defining transversely extending wedge-shaped receptacles, said receptacles opening at their outer ends through the outer flange.

2. In a vehicle wheel, a felly of channel shaped cross sectional configuration including an endless web portion and inboard and outboard flanges, the inboard flange being of a diameter greater than the outboard flange, pairs of circumferentially spaced transversely extending ribs between and connecting the flanges defining transversely extending wedge shaped receptacles, said receptacles opening out at their outer ends through the outboard flange, a tire rim including a main section having an inboard tire flange and an annular body and a supplementary section having an outboard tire flange and laterally projecting arcuate flanges for engaging the inner surface of the body of the main section, the main section having transversely extending keys formed thereon provided with laterally extending noses, complementary keys carried by the supplemental section for snugly engaging the first mentioned keys and having notches in the side edges thereof for receiving the noses, a complementary key member being removably received in each of said receptacles, an annular flange formed on the supplementary sections for engaging the outboard flange to the felly, and means for securing the last mentioned flange of the supplemental sections to the outboard flange of the felly.

In testimony whereof I affix my signature.

WILLIAM O. ALEXANDER.